Figure 1:
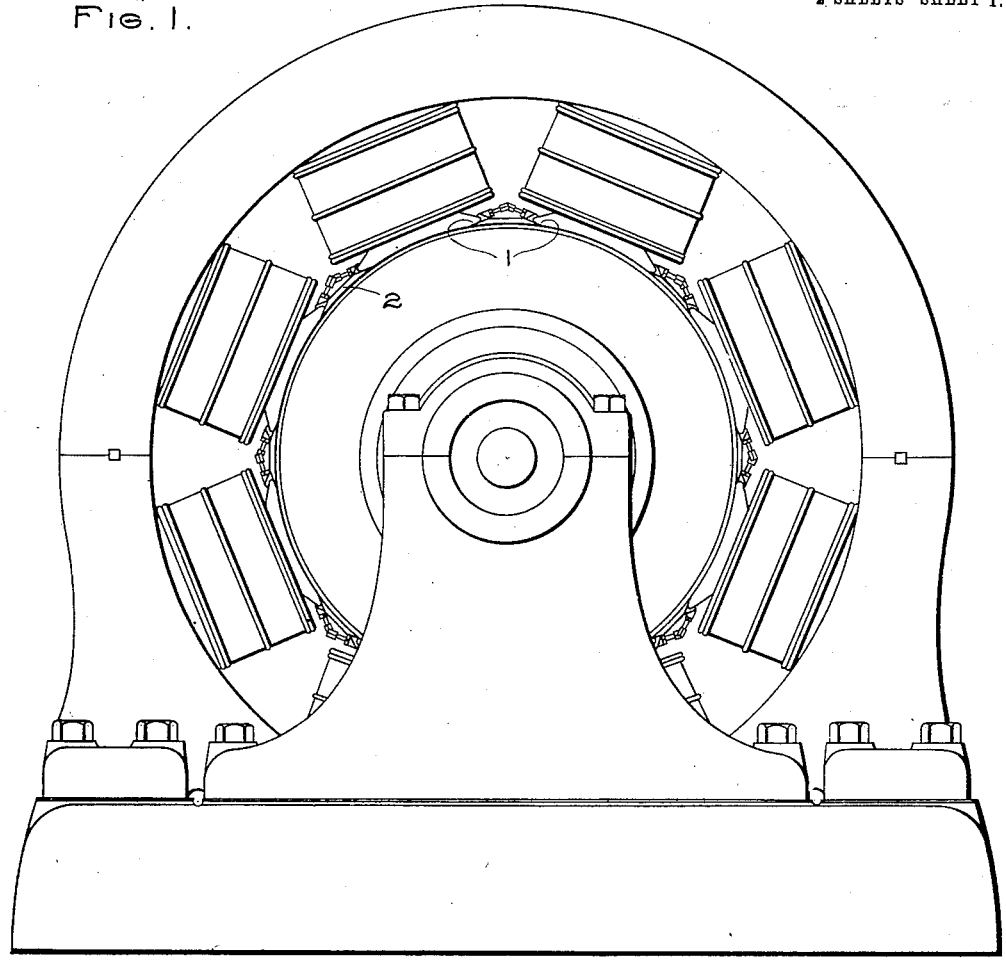

No. 732,654. PATENTED JUNE 30, 1903.
E. W. RICE, Jr. & E. J. BERG.
MEANS FOR MAINTAINING SYNCHRONOUS ROTATION OF DYNAMO ELECTRIC MACHINES.
APPLICATION FILED MAR. 24, 1902.
NO MODEL. 2 SHEETS—SHEET 1.

WITNESSES
Harry H. Tilden.
Helen Orford

INVENTORS:
Edwin W. Rice, Jr.,
Ernst J. Berg.
by Albert G. Davis
Att'y.

No. 732,654. PATENTED JUNE 30, 1903.
E. W. RICE, Jr. & E. J. BERG.
MEANS FOR MAINTAINING SYNCHRONOUS ROTATION OF DYNAMO ELECTRIC MACHINES.
APPLICATION FILED MAR. 24, 1902.
NO MODEL. 2 SHEETS—SHEET 2.

WITNESSES:
Harry H Tilden
Helen Orford

INVENTORS:
Edwin W. Rice, Jr.,
Ernst J. Berg.
by Albert G. Davis
Att'y.

No. 732,654. Patented June 30, 1903.

UNITED STATES PATENT OFFICE.

EDWIN W. RICE, JR., AND ERNST J. BERG, OF SCHENECTADY, NEW YORK, ASSIGNORS TO GENERAL ELECTRIC COMPANY, A CORPORATION OF NEW YORK.

MEANS FOR MAINTAINING SYNCHRONOUS ROTATION OF DYNAMO-ELECTRIC MACHINES

SPECIFICATION forming part of Letters Patent No. 732,654, dated June 30, 1903.

Original application filed August 28, 1899, Serial No. 728,651. Divided and this application filed March 24, 1902. Serial No. 99,588. (No model.)

*To all whom it may concern:*

Be it known that we, EDWIN W. RICE, Jr., and ERNST J. BERG, citizens of the United States, and residents of Schenectady, county of Schenectady, State of New York, have invented certain new and useful Improvements in Means for Maintaining Synchronous Rotation of Dynamo-Electric Machines, (division of application, Serial No. 728,651, filed August 28, 1899,) of which the following is a specification.

The invention herein described relates to a means for securing uniform rotation of one or more alternating-current dynamo-electric machines normally operating in synchronism with another machine or machines. The phenomenon which it is the object of this invention to prevent consists of a periodic variation in speed of dynamo-electric machines, which has come to be known in the art as "hunting" and may be characterized as the result of a superposition of an oscillation upon a speed of uniform angular velocity.

Our invention is particularly useful in connection with rotary converters, since these machines are particularly subject to this trouble; but it is in no sense to be considered as limited thereto, but will be found useful in connection with synchronous motors and other machines as well.

The concrete embodiment of our invention while simple in structure will best be understood in its mode of operation by first considering in a general way the nature of the phenomena with which it deals.

The hunting of converters occurs in either of two forms or as a complication of both— one a pulsation in the speed of the converter corresponding with a pulsation of the prime mover due to irregularity in driving power, the other a pulsation in the speed of the converter with a period of its own, the latter depending upon various circumstances, the more important of which are the moment of inertia of the armature and the strength of the field.

If the hunting of the converter is due principally to the varying frequency of the current supplied from the source of power, it can never be entirely cured by the application of any device to the converter itself, since the difficulty is inherent to the operation of the source of supply. The difficulty can, however, be made insignificant and its accumulative effect avoided by the use of our invention.

The hunting inherent in the operation of the converter itself is due to the fact that the armature of the machine does not always keep rigidly in step or in phase with the impressed alternating wave, but may slip backward or forward from the neutral position or position corresponding to uniform rotation. The converter-armature always tends to assume this neutral position, but may vibrate about the same back and forth much in the same way as the pendulum vibrates back and forth across the point corresponding to its position of rest. If while the converter-armature is in a condition of uniform rotation there occurs some change in the conditions of operation which effect the pull between the armature and the field—such, for instance, as a sudden change or pulsation in frequency of the current supplied or a change in voltage or a change in load—then the uniform rotation of the converter-armature is disturbed and the armature is either dragged back or pulled forward from its neutral position. Instead, however, of instantly assuming a new neutral position the armature vibrates like a pendulum back and forth with a rate dependent upon various factors and often with such amplitude as to cause violent fluctuations or surges in the current supplied to the machine and in the voltage at its terminals, and if the conditions are such as to cause an accumulative effect the machine may actually be thrown out of synchronism.

The means to be employed in preventing the occurrence of the phenomena described must obviously be such as will dampen out the initial oscillations in speed and prevent their accumulative effect. Those factors in the operation of the converter which tend to increase hunting or to lessen it will be described only in so far as they may be of use toward an understanding of our invention.

In the converter-armature the reactions of the direct current and the energy component of the alternating current are equal and opposite, and thus neutralize each other, while the armature reaction of the wattless component of the alternating current is either in phase or in opposition to the field, thus strengthening or weakening the same, as the case may be. If, however, from any cause, such as those mentioned, the converter-armature shifts from its neutral position, the alternating-armature reaction shifts with it, while the direct-current reaction remains stationary in the position of the commutator-brushes, thus disturbing the balance between the two armature reactions and producing a resultant magnetomotive force or reaction acting in the space between the field-poles. This magnetomotive force gives rise to a flux of greater or less magnitude, which flux for convenience we may term the "interpolar" flux. This flux may be considered as made up of two components, one acting at right angles to the field-flux, the other either in phase or in opposition to it. The first acts upon each pole as a cross-magnetizing flux, strengthening one pole-corner and weakening the other, or the reverse, but has no other effect upon the field, while the other increases or decreases the strength of the field. We have found that creating opposition to either of these two results or effects is equivalent to opposing the cause which produced them.

It has heretofore been proposed to encircle the field-poles of the rotary converter with short-circuited windings in order to oppose that component of armature reaction which tends to vary the strength of the field. We have discovered, however, that this is a distinct disadvantage, and this conclusion has been verified in practice. The field structure necessarily consists of a large mass of magnetic material which, by reason of hysteresis, eddy-currents, and other causes which produce a lagging effect, is necessarily slow to respond to changes of magnetomotive force. If, therefore, the field variations produced by armature reaction are opposed by currents set up in a short-circuited winding or windings in inductive relation to the field, the result is a reaction lagging behind the effect which produced it and greater in magnitude than otherwise would be the case without the use of the short-circuited winding. Suppose this reaction to be set up as the result of an oscillation of the converter-armature. As the armature shifts in one direction the field strengthens, and the armature is driven back and toward the neutral position, passing by the same in the manner already described and moving away from the neutral in the opposite direction, thereby producing an opposite reaction upon the field, which in its turn causes the armature to move back again toward the neutral. Owing, however, to the sluggishness or lag in variation of the field, the movement of the armature away from the neutral does not begin to meet instantly with opposition, so that on the return oscillation the lagging reaction of the induced currents set up in the short circuits on the field during the forward movement of the armature is added to the pull on the armature, normally acting to drag it back to its neutral position. The retarding effect on the armature while moving away from its neutral position is thus less than the accelerating effect when returning to the neutral position, so that the result is equivalent to the addition of a fresh impulse during each acceleration. In a general way we believe these to be the reasons why a positive disadvantage results from attempting to suppress variations in the value of the field-flux in order to prevent hunting; but we do not hold ourselves responsible for the accuracy of these theoretical deductions, and advance the same simply by way of explanation of the facts which we have found to be true in practice. Instead, therefore, of opposing the variations in the field of the converter, as described, we have found it of great advantage over this mode of procedure to oppose only that component which tends to strengthen and weaken the pole-corners without necessarily varying the strength of the field—in other words, to oppose the cross-magnetizing tendency of the armature reaction. The flux which causes this cross-magnetizing tendency is produced by a magnetomotive force acting between the poles of the converter, and for this reason we have, as above stated, called the flux thus produced or which the magnetomotive force tends to produce the "interpolar" flux. By opposing the variation in this flux the variations or causes which produce it are consequently opposed, and the tendency of the converter to hunt is thus greatly reduced and generally entirely eliminated.

We are aware that it has heretofore been proposed to place short circuits both about the field-poles and between the poles in order to intercept both components of the armature reaction. Our invention is a distinct improvement over this construction and involves more than a mere omission of one of the sets of short circuits, since by such omission we secure an improved and more effective means for preventing the above-described hunting of synchronous machines.

From what has been said it will be seen that our invention involves the use of short circuits of suitable form placed between the field poles or tips and omitted from the field proper. These short circuits in the forms employed by us we designate as "bridges." Their structure will be best understood by reference to the following description, taken in connection with the accompanying drawings, while the scope of our invention, which involves the use of short circuits of this or other suitable form, will be particularly pointed out in the appended claims.

Figure 2:
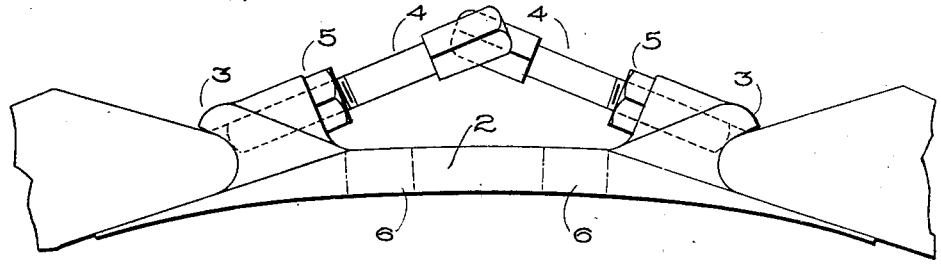
Figure 3:
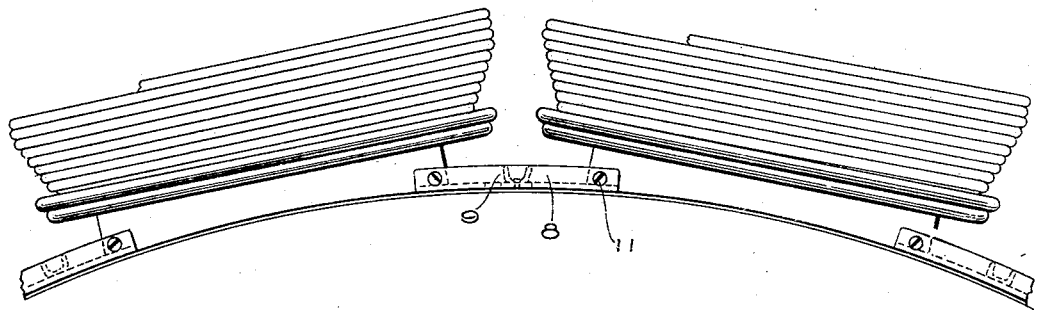
Figure 4:
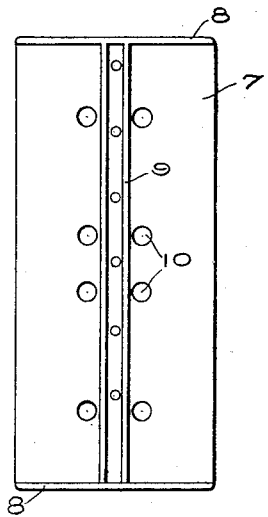

Figure 1 illustrates the application of bridges to a rotary converter. Fig. 2 is an enlarged view of a bridge. Figs. 3 and 4 illustrate another form of bridge.

In Fig. 1 the pole-tips of the converter are shown as being chamfered at 1—that is to say, they are slightly cut away at their edges opposite the armature of the converter. This allows the bridge 2 to undercut, as it were, the corner of each pole-tip. This construction is best shown in detail in Fig. 2, in which it will appear from inspection that the bridge 2 may thus be fashioned so as to be brought into very close proximity to the armature, and thus intercept the greatest possible number of lines of force emanating from the same and passing into the pole-corners. By causing the sides of the bridge to undercut the pole-corners the flux which passes through the bridge is intensified by reason of the better magnetic circuit formed by the pole-tips, in front of which the edges of the bridge are placed.

A convenient means for securing the bridges in place consists of hooked projections 3, cast integral with the bridge and in such a position as to embrace the opposing pole-tips, as is clearly shown in Fig. 2. Set-screws 4, provided with suitable check-nuts 5, may be used for clamping the bridges in position.

To provide for ventilation, the bridge may be pierced with holes, (indicated at 6 in dotted lines,) or, if desired, the whole central portion of the bridge may be cut away. This latter construction, however, is not quite so desirable as the former, since it reduces the cross-section of available conducting material in the bridge. It is, however, quite effective.

Fig. 4 shows a form of bridge which for convenience is made from sheet-copper. This bridge consists of a sheet 7 with bent-up ends (indicated at 8) and provided with a U-shaped strengthening-rib 9. (Shown in section in dotted lines in Fig. 3.) As in the first form of bridge shown, suitable ventilating-holes 10 are provided in order to permit a circulation of air over the armature, and thus allow the same to cool. This bridge is secured to the pole-pieces, as shown in Fig. 3, and is arranged to be let into the pole-tips, so that the surface near the armature is flush with the polar surfaces. The bridge is fastened in position by means of screws 11, passing through the turned-up ends 8 of the bridge into the pole-pieces.

What we claim as new, and desire to secure by Letters Patent of the United States, is—

1. A device for preventing hunting of rotary converters, consisting of a bridge of copper provided with a ventilating-opening and adapted to extend between two adjacent pole-pieces.

2. A device for preventing hunting of rotary converters, consisting of a bridge of highly-conducting non-magnetic material adapted to extend between two adjacent pole-pieces.

3. The combination with an alternating-current dynamo-electric machine provided with field-poles of constant polarity, of bridges of highly-conducting non-magnetic material extending between each pair of poles and unconnected with each other electrically except for such connection as is afforded by contact between the bridges and the poles which they engage.

4. The combination with an alternating-current dynamo-electric machine provided with field-poles, of bridges of highly-conducting, non-magnetic material extending between and undercutting the opposing pole-corners of each pair of poles.

5. The combination with an alternating-current dynamo-electric machine provided with field-poles, of bridges of highly-conducting non-magnetic material extending between and undercutting the opposing pole-corners of each pair of poles, one at least of said bridges being provided with a ventilating-hole.

6. The combination with an alternating-current dynamo-electric machine provided with field-poles of constant polarity, of bridges of conducting, non-magnetic material, spanning the interpolar spaces, but not embracing the field-poles.

In witness whereof we have hereunto set our hands this 22d day of March, 1902.

EDWIN W. RICE, JR.
ERNST J. BERG.

Witnesses:
BENJAMIN B. HULL,
HELEN ORFORD.